(12) United States Patent
Nagayasu et al.

(10) Patent No.: US 7,110,800 B2
(45) Date of Patent: Sep. 19, 2006

(54) COMMUNICATION SYSTEM USING SHORT RANGE RADIO COMMUNICATION HEADSET

(75) Inventors: Katsuyoshi Nagayasu, Kanagawa (JP);
Shinichi Tanaka, Kanagawa (JP);
Kohei Momosaki, Kanagawa (JP);
Yoichi Takebayashi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 361 days.

(21) Appl. No.: 10/325,934

(22) Filed: Dec. 23, 2002

(65) Prior Publication Data

US 2003/0118197 A1    Jun. 26, 2003

(30) Foreign Application Priority Data

Dec. 25, 2001    (JP) ............................. 2001-392915

(51) Int. Cl.
H04M 1/00 (2006.01)
H04R 5/02 (2006.01)
H04B 7/00 (2006.01)

(52) U.S. Cl. ............................. 455/575.2; 455/569.1; 455/41.2; 381/309; 381/310; 381/311

(58) Field of Classification Search ............. 455/575.2, 455/569.1, 570, 41.2; 381/74, 309, 310, 381/311, 313, 317
See application file for complete search history.

(56) References Cited

U.S. PATENT DOCUMENTS

| | | | |
|---|---|---|---|
| 4,132,861 A * | 1/1979 | Frieder et al. .............. | 381/335 |
| 5,029,218 A | 7/1991 | Nagayasu | |
| 5,787,414 A | 7/1998 | Miike et al. | |
| 6,560,468 B1 * | 5/2003 | Boesen .................... | 455/569.1 |

* cited by examiner

*Primary Examiner*—Matthew Anderson
*Assistant Examiner*—Eugene Yun
(74) *Attorney, Agent, or Firm*—Oblon, Spivak, McClelland, Maier & Neustadt, P.C.

(57) ABSTRACT

In a short range radio communication headset, signals transmitted by the short range radio communications are received while direct sounds propagated from an external are detected. Then, a digital signal adaptation processing using either received signals or the direct sounds as reference signals are applied, and a ratio between the received signals and the direct sounds is controlled by correlating the reference signals and another one of the received signals and the direct sounds that are not used as the reference signals and extracting necessary components.

13 Claims, 9 Drawing Sheets

COMMUNICATION SYSTEM USING SHORT RANGE RADIO COMMUNICATION HEADSET

BACKGROUND OF THE INVENTION

1. Field of the Invention

The present invention relates to an acoustic processing technique for a short range radio communication headset, and more particularly to a headset communication system that realizes smoothing of communications by selectively adjusting and controlling necessary speeches from a plurality of types of speeches.

2. Description of the Related Art

A short range wireless communication system called Bluetooth has developed so that it becomes possible to connect and control devices such as PC, printer, portable telephone, digital camera, etc., within rooms or offices, without using any cords.

In this trend, in order to urge the application of the system to the mobile environment, there is a proposition to use a headset with a speech input function. The short range radio communication system centered around the headset with a speech input function is intended for communications and device controlling within about 10 m, which is a distance range visible by eyes. For this reason, in addition to the speeches transmitted/received through the radio communications, speeches directly uttered to a correspondent, speeches of a nearby third person, and noises will also reach to the user's ears. Consequently, there is a need for a technique to eliminate the unnecessary sounds according to the situation, such that only the necessary sounds can be extracted and outputted to the user's ears.

As the conventional speech processing techniques, the active noise control and the echo canceller technique for the long distance telephone lines are known. The active noise control tries to cancel all the arriving sounds without selecting the sound types. The echo canceller technique for the long distance telephone lines tries to cancel echoes. These techniques are not something that was developed for the short range radio communication headset so that it is difficult to apply them in their original forms.

Figure 11:
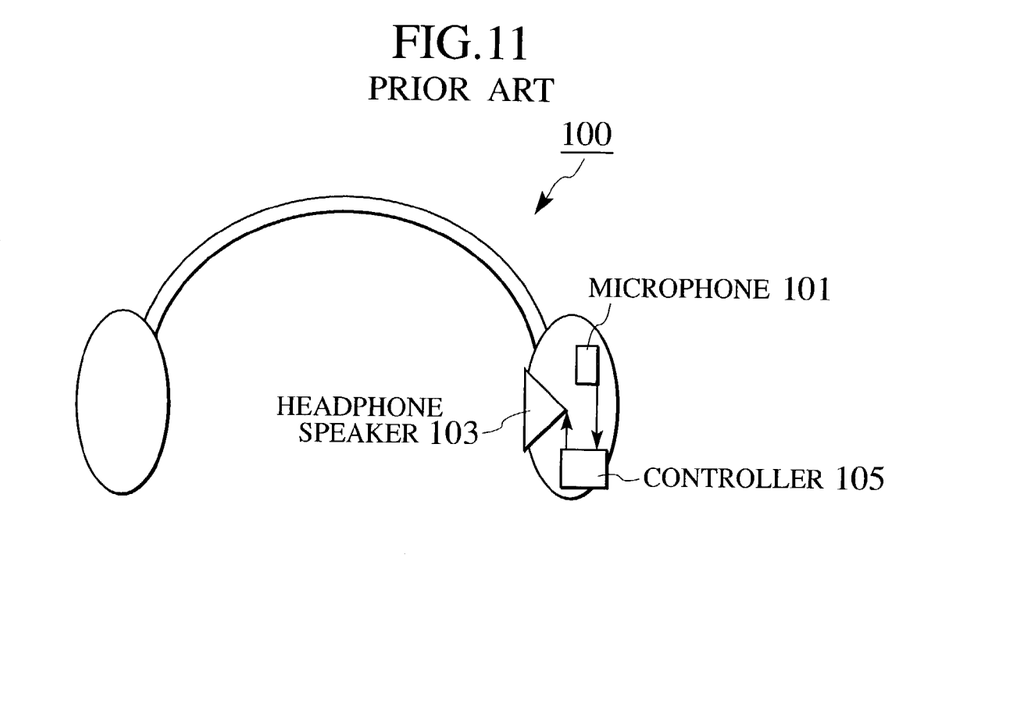
FIG. 11 is a diagram showing an overview of a conventionally known general headset for acoustic use.

FIG. 11 shows a feedback type active noise canceller used by a headset for acoustic use. A microphone 101 is mounted on a headphone mount, and the microphone signals are multiplied by some filter coefficient by the controller 105 and sent to a headphone speaker 103, and made to interfere with the external sounds to cancel them out. At this point, the filter coefficient is constantly adjusted such that the sounds picked up by the microphone becomes minimum. This is the feedback control for controlling output by feeding back the control target signals. The feedback type has a limit to the amount of noise reduction, but a configuration is relatively simple so that it is often used as the active noise canceller of a headset for acoustic use.

Figure 12:
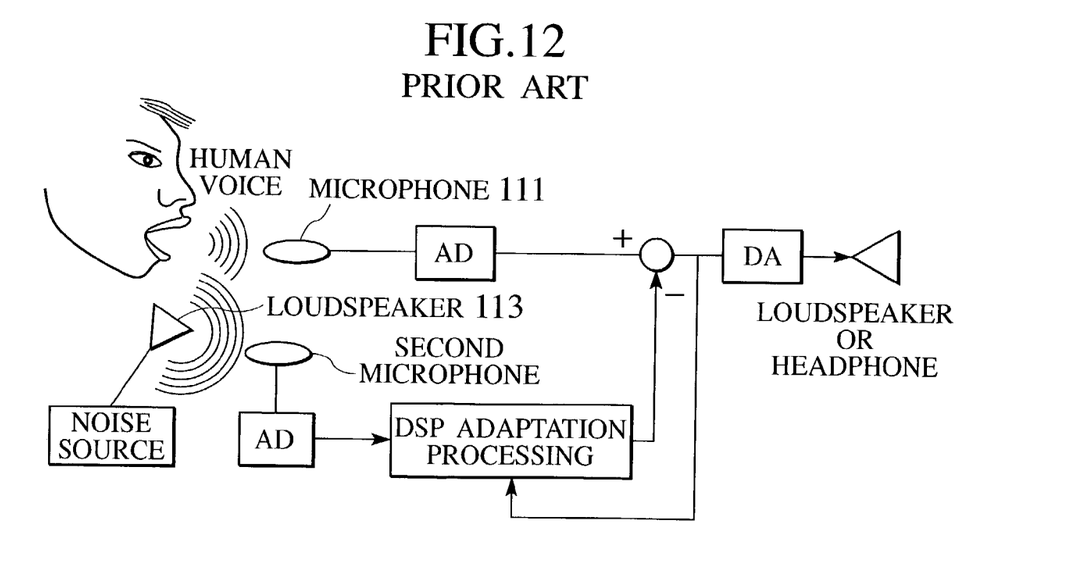
FIG. 12 is a block diagram showing a conventionally known general acoustic processing system for noise removal.

FIG. 12 shows an exemplary general method used for the noise removal. In the example of FIG. 12, the human voice alone is extracted from signals in which the human voice and the sounds coming from the headphone speaker 113 as a noise source are mixed.

Examples shown in FIG. 11 and FIG. 12 are not something that was developed for the short range radio communication system, and there has been no proposition conventionally of a method for comparing the sounds transmitted by the radio communications and the external sounds that are directly picked up, and reinforcing or reducing either one of them selectively according to the situation.

BRIEF SUMMARY OF THE INVENTION

It is therefore an object of the present invention to provide a headset capable of making speech communications and speech commands smooth by selectively changing a ratio of the external direct sounds and the sounds transmitted by the radio communications, in every possible situation under which the short range radio communication headset is expected to be utilized, and a communication system using such a headset.

The short range headset system of the present invention will be useful in communications with respect to mass audience such as those of a conference, a lecture, a factory tour, a museum tour, etc., random communications among plural persons, one-to-one dialogue style communications, recording of contents of these communications, dictation by a single person, and speech command controlling of a device equipped with a short range wireless communication function such as Bluetooth, for example.

According to one aspect of the present invention there is provided a short range radio communication headset, comprising: a transmitter configured to transmit or receive signals by short range radio communications; an external sound detection microphone configured to detect direct sounds propagated from an external; a speech processing unit configured to receive inputs of received signals received by the transceiver and the direct sounds detected by the external sound detection microphone, and selectively control a ratio between the received signals and the direct sounds; and a speaker configured to output speeches with the ratio controlled by the speech processing unit.

According to another aspect of the present invention there is provided a short range radio communication headset system, comprising: a first headset for short range radio communications; a second headset for short range radio communications which transmits speeches to the first headset; and a speech processing device configured to apply a speech processing to the speeches transmitted by the second headset and supply processed signals to the first headset; wherein the first headset has a receiver, an external sound detection microphone for detecting direct sounds from an external, and a transmitter for transmitting the direct sounds to the speech processing device at a first frequency; the second headset has a transmitter for transmitting the speeches to the speech processing device at a second frequency; and the speech processing device receives the direct sounds from the first headset and the speeches from the second headset, selectively adjusts a ratio of the direct sounds and the speeches and transmits adjusted signals to the first headset at a third frequency.

According to another aspect of the present invention there is provided a short range radio communication headset, comprising: a speaker's microphone configured to detect a speech command of a user; an external sound detection microphone configured to detect external sounds of a surrounding; a speech processing unit configured to receive inputs of the speech command and the external sounds, correlate the external sounds with the speech command, and extract only components correlated with the speech command; and a transmitter configured to transmit an output of the speech processing unit to a remote device by a short range radio communication.

According to another aspect of the present invention there is provided a short range radio communication headset, comprising: a transmitter capable of radio transmission with respect to surrounding devices; a speaker's microphone configured to detect speeches of a user; a speech recognition unit configured to recognize the speeches detected by the speaker's microphone; and a recognition result transmission unit configured to supply a recognition result obtained by the speech recognition unit to the transmitter, such that the recognition result is transmitted from the transmitter.

According to another aspect of the present invention there is provided an acoustic processing method for short range radio communications, comprising: receiving signals transmitted by the short range radio communications; detecting direct sounds propagated from an external as sound waves; applying a digital signal adaptation processing using either received signals or the direct sounds as reference signals; controlling a ratio between the received signals and the direct sounds by correlating the reference signals and another one of the received signals and the direct sounds that are not used as the reference signals and extracting necessary components; and outputting signals with the ratio controlled by the controlling step as speeches.

According to another aspect of the present invention there is provided an acoustic processing method for a short range radio communication headset system, comprising: receiving direct sounds from an external detected by a first headset as first received signals through short range radio communications; receiving speeches transmitted by a second headset to the first headset as second received signals through short range radio communications; applying an adaptation processing using either the first received signals or the second received signals as reference signals; controlling a ratio of the first received signals and the second received signals by correlating the reference signals and another one of the first received signals and the second received signals that are not used as the reference signals and extracting necessary components; and transmitting signals with the ratio controlled by the controlling step to the first headset through the short range radio communications.

Other features and advantages of the present invention will become apparent from the following description taken in conjunction with the accompanying drawings.

DETAILED DESCRIPTION OF THE INVENTION

Referring now to FIG. 1 to FIG. 6, the first embodiment of the present invention will be described in detail.

Figure 1:
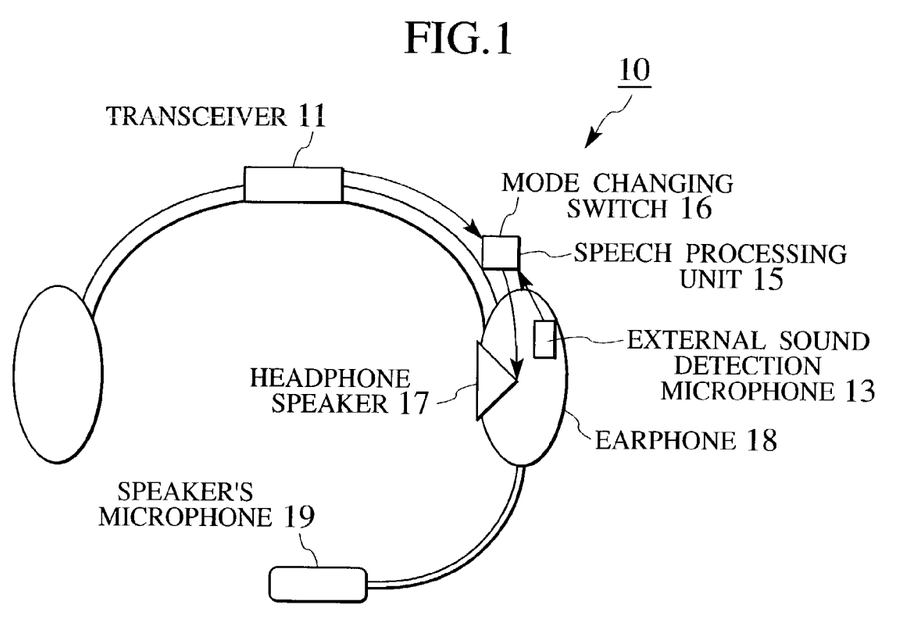
FIG. 1 is a diagram showing an overview of a short range radio communication headset according to the first embodiment of the present invention.

FIG. 1 shows a short range radio communication headset (hereafter referred simply as "headset") according to the first embodiment of the present invention. A headset 10 with a short range radio communication function has an external sound detection microphone 13 for picking up direct sounds propagating from the external as sound waves, a transceiver 11 for transmitting or receiving speeches through radio communications, a speech processing unit 15 for receiving inputs of the direct sounds picked up by the external sound detection microphone 13 and the speeches received by the transceiver 11 and controlling a ratio of the direct sounds and received signals, and a headphone speaker 17 for outputting speeches with its ratio controlled by the speech processing unit 15.

The headset 10 may additionally have a speaker's microphone 19 for detecting a voice of a wearer (user) of the headset 10. The speaker's microphone 19 is used in the case where the speech command is to be issued to a surrounding device through the transceiver 11 or in the case where the radio communication is to be carried out with a second headset (not shown).

The headset 10 also has a mode changing switch 16 connected to the speech processing unit 15. The user can determine to make the direct sounds from the external dominant or the speeches received through the radio communication dominant in the processing of the speech processing unit 15, by operating the mode changing switch 16 according to the situation. Such a mode changing switch 16 may be provided in a form of a button that is connected to the speech processing unit 15 through a cord such that it can be placed near at hand of the user for easy operation.

Figure 2:
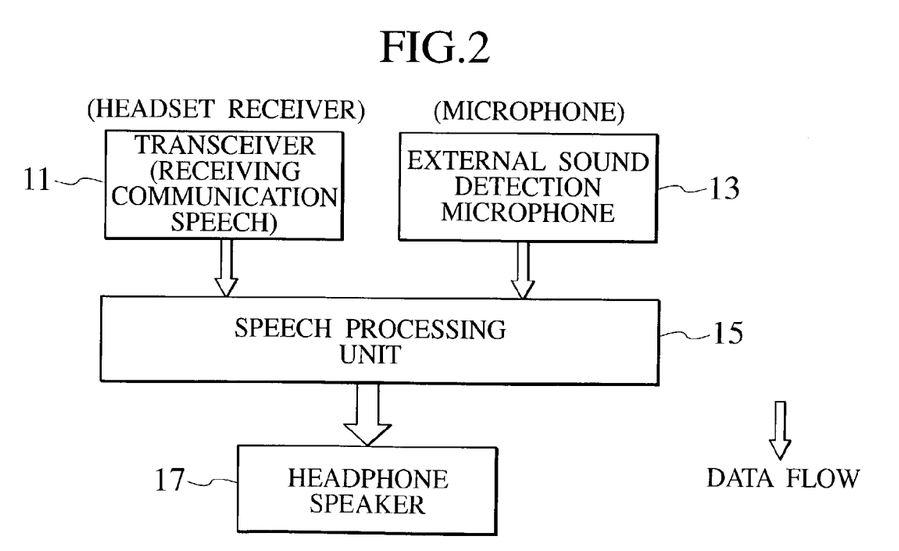
FIG. 2 is a diagram showing a basic flow of data in the headset of FIG. 1.

FIG. 2 shows a flow of data in the headset 10 shown in FIG. 1. The direct sounds detected by the external sound detection microphone 13 and the speeches received by the transceiver 11 of the headset are both inputted into the speech processing unit 15. The speech processing unit 15 changes a ratio of the direct sounds and the received speeches, and outputs them to the headphone speaker 17. The exemplary ways of changing the ratio may include the following.

(1) When it is desired to hear the speeches received through the radio communication preferentially, the direct sounds from the external are selectively removed. For example, only the components correlated with the speeches received through the radio communication are left and all the other non-correlated portions are deleted. In this way, the speeches of the radio communication are reinforced such that it becomes easier to hear the communication content.

(2) When it is desired to hear the direct sounds preferentially, the speeches received through the radio communication are selectively removed. For example, all portions not correlated with the direct sounds are deleted and only the correlated components are extracted. In this way, even in a state of wearing the headset 10, it becomes easier to hear the direct sounds from the external as they are reinforced. In particular, in the case of carrying out the dialogue type radio communication through the headset 10 at relatively close positions, there can be cases where the direct sounds and the received speeches of the same contents are mixed up such that it becomes rather hard to listen, but in such cases it becomes possible hear the direct sounds dominantly in this way.

(3) When it is desired to hear only the speeches received through the radio communication, all the direct sounds from the external are shut off. This control is carried out when it becomes difficult to hear the received speeches as the direct sounds contain many noises.

(4) The volume of the speeches received through the radio communication is changed according to a positional relation between the source and the headset 10 at the receiving side, using a position information of the source. In this case, transmission/reception of the position information becomes necessary in addition to transmission/reception of the speech data, through the radio communication.

As a way of realizing the above described correlation processing, it is possible to use an adaptive filter for executing the adaptation processing and the correlation calculation, for example.

Figure 3A:
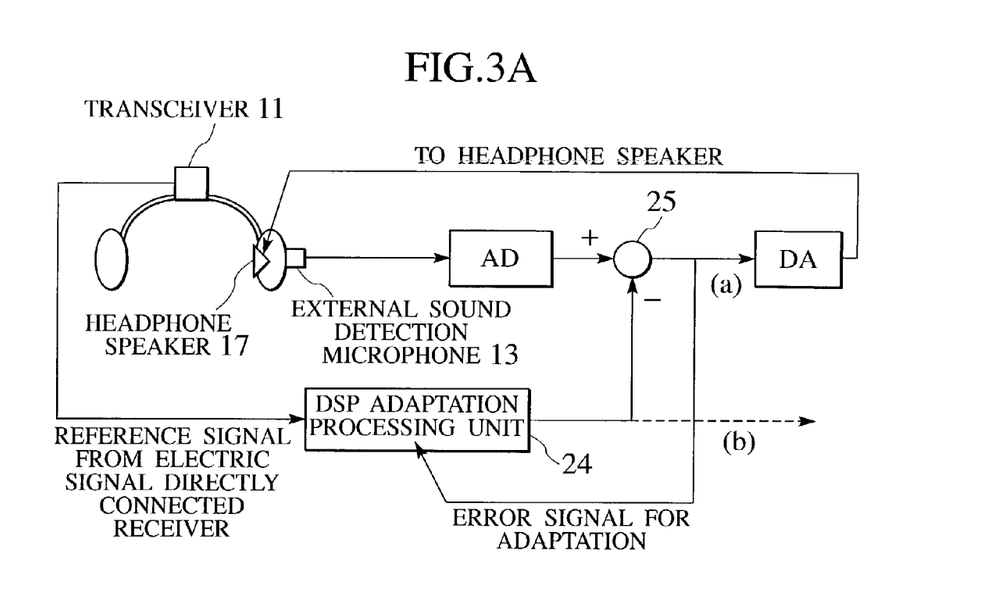
FIGS. 3A and 3B are diagrams showing the speech processing of the headset of FIG. 1 in the case of using a speech received through a radio communication as a reference signal.
Figure 3B:
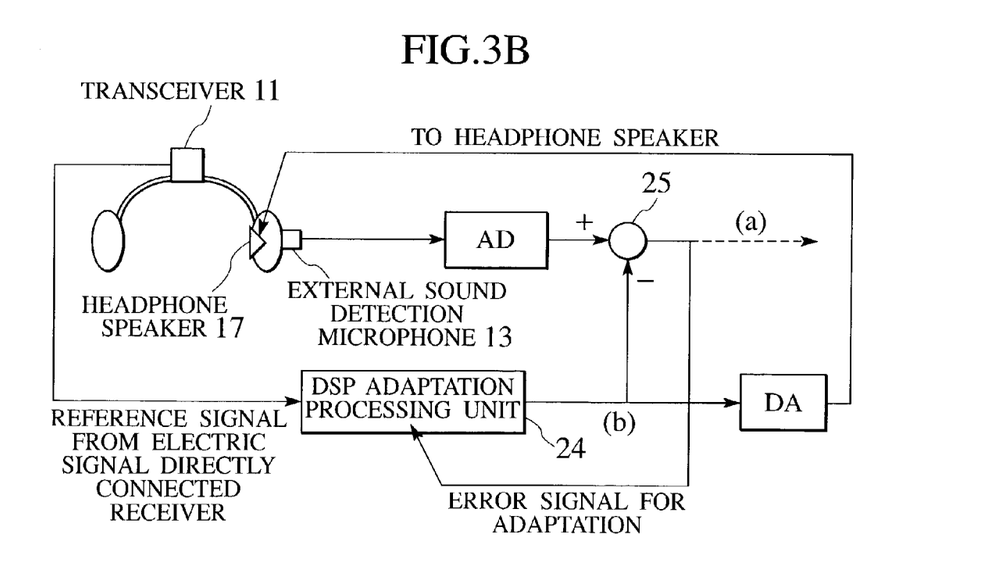

FIGS. 3A and 3B show an exemplary operation of the speech processing unit 15 of FIG. 1, that is, the operation for controlling a ratio of the direct sounds from the external and the speeches received through the radio communication.

FIG. 3A shows the case where the speech received by the transceiver 11 through the radio communication is a single speech and the direct sounds from the external contain plural mixed sounds, and it is desired to hear the direct sounds. Note that the speaker's microphone 19 and the mode changing switch 16 are omitted in the figure for the sake of simplicity.

The speech processing unit 15 mainly comprises a DSP adaptation processing unit 24 for applying the DSP adaptation processing using signals received through the radio communication as reference signals, and a correlation processing unit 25 for correlating the DSP adaptation processed received signals with the direct sounds from the external that are picked up by the external sound detection microphone 13. The correlation processing unit 25 obtains the correlation in the requested mode and outputs only the necessary components. An adaptive filter is formed by the DSP adaptation processing unit 24 and the correlation processing unit 25.

As the speech processing operation, the user selects a desired mode (a direct sound mode, for example) by operating the mode changing switch 16 first. The speech processing unit 15 carries out the DSP adaptation processing using the single sound of the speech received through the radio communication as the reference signal, and supplies the processed speech to the correlation processing unit 25. On the other hand, the direct sounds picked up by the external sound detection microphone 13 are A/D converted and supplied to the correlation processing unit 25. The correlation processing unit 25 removes components correlated to the reference signal obtained from the radio communication among the direct sounds according to the selected mode and outputs only the non-correlated components. In this way, the portions correlated with the speeches of the radio communication are removed and the direct sounds from the external that are made clearer will be sent to the headphone speaker 17.

Such a mode will be selected in the case where there is an announcement during a conversation through the headset at a party site, for example.

FIG. 3B shows the case where the speech received by the transceiver 11 through the radio communication is a single speech and the direct sounds from the external contain plural mixed sounds, and it is desired to hear the speech received by the transceiver 11.

The user selects a desired mode (a communication mode) by operating the mode changing switch 16 first. The speech processing unit 15 carries out the DSP adaptation processing using the single sound of the speech received by th transceiver 11 as the reference signal, and supplies the processed speech to the correlation processing unit 25. On the other hand, the direct sounds picked up by the external sound detection microphone 13 are A/D converted and supplied to the correlation processing unit 25. The correlation processing unit 25 removes components not correlated to the reference signal obtained from the radio communication among the direct sounds and outputs only the correlated components. In this way, the speech received through the radio communication is outputted in the reinforced state from the headphone speaker 17.

Figure 4:
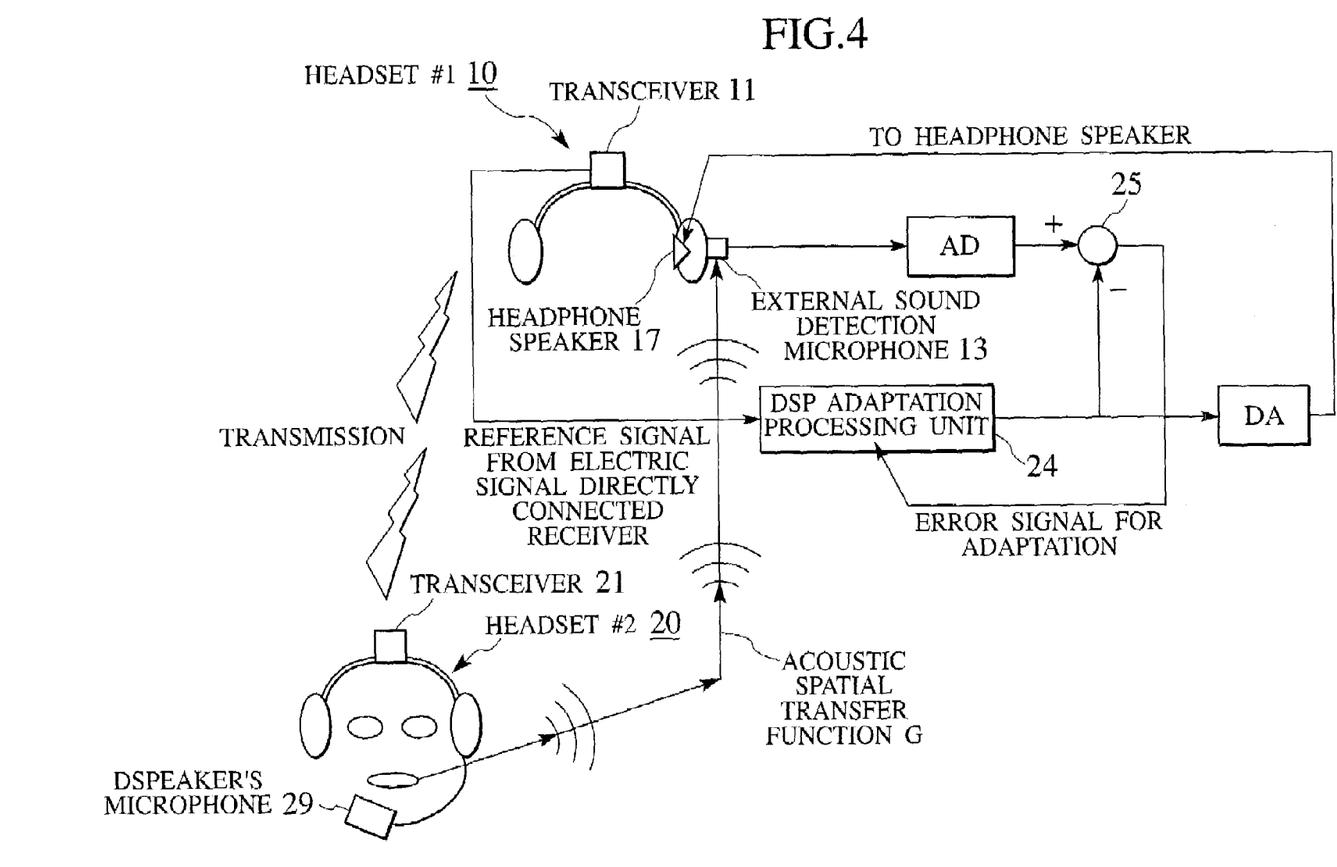
FIG. 4 is a diagram showing the speech processing of a headset system using a plurality of the headset of FIG. 1 in the case of using a speech received through a radio communication as a reference signal.

FIG. 4 shows the case where a first user wearing a first headset 10 and a second user wearing a second headset 20 carry out dialogue.

To the first user wearing the first headset 10, the speech of the second user received by the transceiver 11 through the radio communication and the direct sounds propagated through the air as sound waves reach. In the direct sounds picked up by the external sound detection microphone 13, the speech of the second user is mixed with a plurality of other speeches, which sounds like noises. The first user selects the communication mode in order to weaken the direct sounds of the external and hear the speech of the second user transmitted by the radio communication more clearly. Here, it is assumed that the transfer function of the transceiver is 1 and the the external sound detection microphone 13 picks up the direct sounds multiplied by an acoustic spatial transfer function G, for the sake of simplicity.

In the headset system of FIG. 4, in response to the selection of the communication mode by the first user, the received speech is set as the reference signal. At this point, what is corresponding to the acoustic spatial transfer function G of the space is set to the DSP adaptation processing unit 24 of the speech processing unit 15. The correlation processing unit 25 obtains the correlation between the reference signal processed by the DSP processing according to the acoustic spatial transfer function G and the direct sounds processed by the digital conversion processing, and outputs only the components correlated with the reference signal to the headphone speaker 17.

The output of the correlation processing unit 25 is also supplied to the DSP adaptation processing unit 24. The DSP adaptation processing unit 24 processes received signals of the radio communication that are inputted this time such that an error becomes smaller than the processing result of the previous time.

By such an operation of the adaptive filter, the effect similar to the application of the automatic delay processing is produced in the received signals of the radio communication which have the propagation speed faster than that of the sound waves.

In this way, it becomes possible to remove only the speech of the second user from the direct sounds, by synchronously correlating the reference signal of the radio communication and the direct sounds picked up by the external sound detection microphone 13.

Figure 5A:
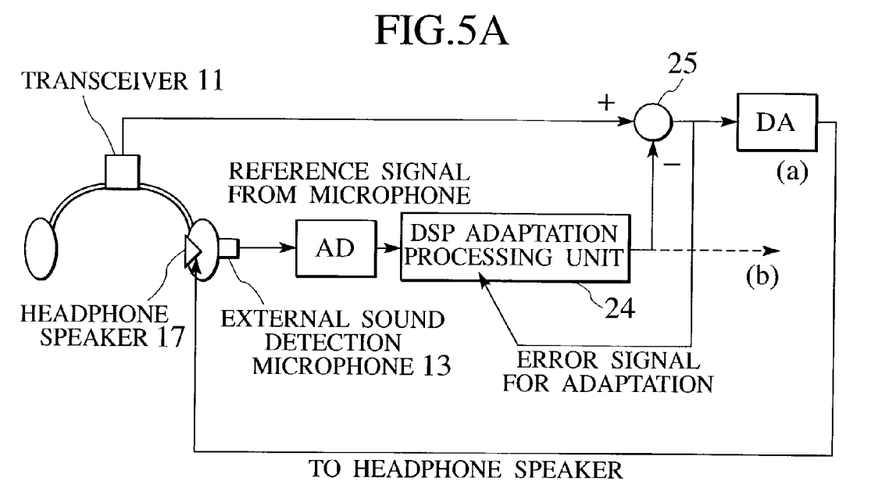
FIGS. 5A and 5B are diagrams showing the speech processing of the headset of FIG. 1 in the case of using a direct sound from an external as a reference signal.
Figure 5B:
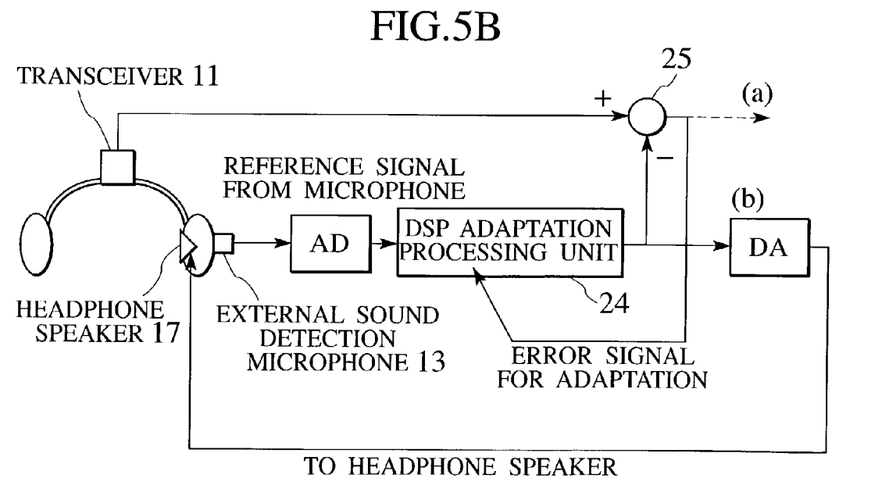

FIGS. 5A and 5B show the case that is opposite to the case shown in FIGS. 3A and 3B, that is, the case where the direct sound picked up by the external sound detection microphone 13 is a single sound and the speeches received by the transceiver 11 through the radio communication contain plural mixed sounds.

FIG. 5A shows the case where it is desired to hear the speeches transmitted through the radio communication rather than the single direct sound from the external. The user selects a desired mode (a communication mode) by operating the mode changing switch 16 first. The speech processing unit 15 carries out the processing according to the mode selected by the user. The single direct sound picked up by the external sound detection microphone 13 is A/D converted, applied with the DSP adaptation processing as the reference signal, and supplied to the correlation processing unit 25. On the other hand, the speeches received by th transceiver 11 through the radio communication are also sent to the correlation processing unit 25. The correlation processing unit 25 removes components correlated with the external sound picked up by the external sound detection microphone 13 among the speeches received by the transmitter 11, and outputs only the non-correlated components to the headphone speaker 17. In this way, the speeches received through the radio communication can be heard clearly from the headphone speaker 17, without being obscured by the direct sound.

FIG. 5B shows the case where it is desired to hear the single direct sound picked up by the external sound detection microphone 13 clearly rather than the speeches received through the radio communication. The user selects a desired mode (a direct sound mode) by operating the mode changing switch 16 first. The speech processing unit 15 carries out the DSP adaptation processing according to the mode selected by the user, by using the direct sound as the reference signal. The direct sound processed by the DSP adaptation processing is supplied to the correlation processing unit 25. On the other hand, the speeches received through the radio communication are also sent to the correlation processing unit 25. The correlation processing unit 25 removes components not correlated with the external sound among the speeches received through the radio communication, and outputs only the correlated components to the headphone speaker 17. In this way, the direct sound can be heard clearly in the reinforced state by the ear of the user.

Figure 6:
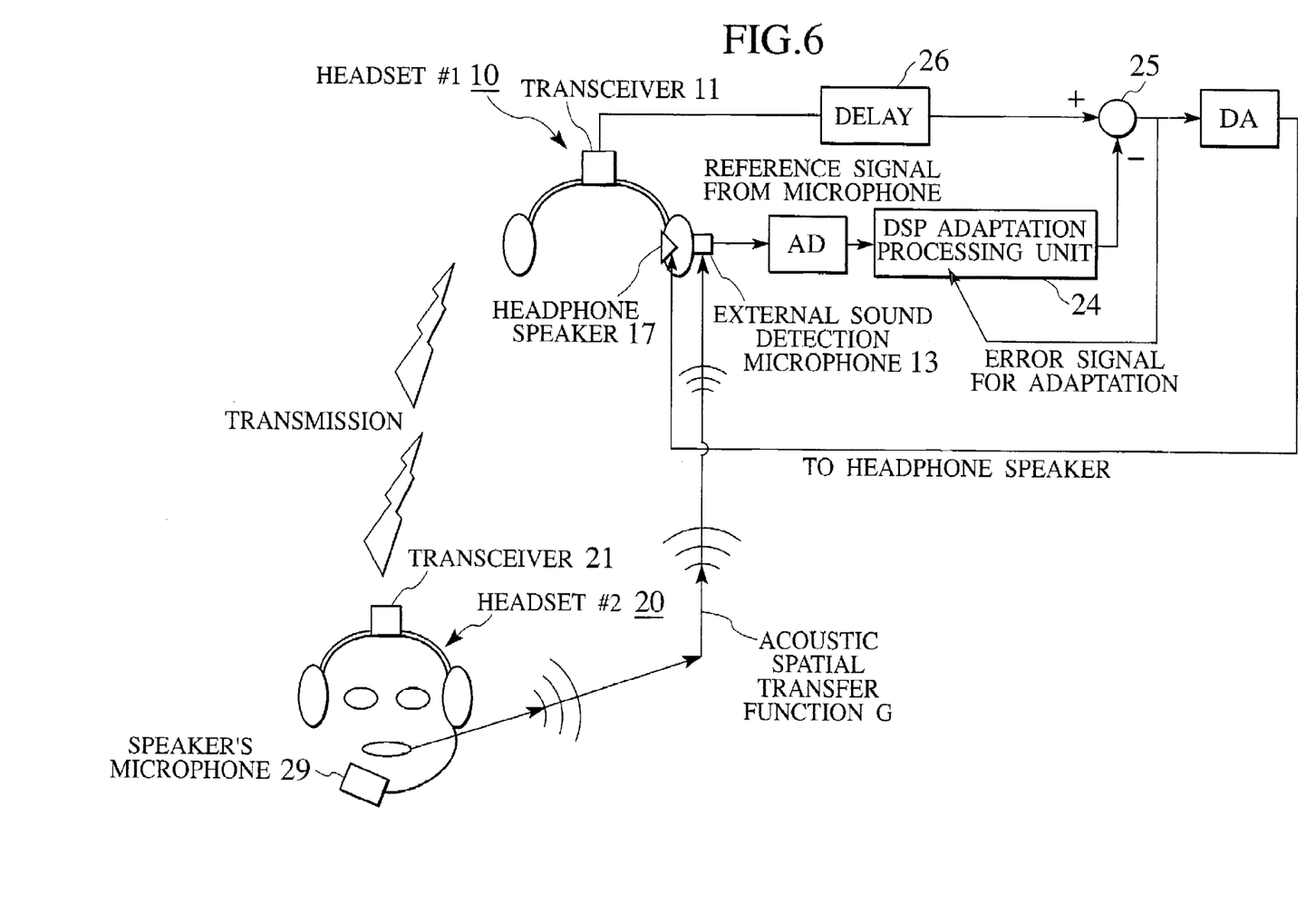
FIG. 6 is a diagram showing the speech processing of a headset system using a plurality of the headset of FIG. 1 in the case of using a direct sound from an external as a reference signal.

FIG. 6 shows the case where a first user wearing a first headset 10 and a second user wearing a second headset 20 carry out dialogue, in the state of using the direct sound as the reference signal as in FIGS. 5A and 5B.

If it is attempted to use the direct sound as the reference signal in the system configuration shown in FIG. 4, the system should operates such that what is corresponding to the inverse of the acoustic spatial transfer function G of the air (1/G) should be set to the DSP adaptation processing unit 24. However, 1/G is of a non-minimum phase type which has a form in which the coefficient appears in a negative time region of the impulse response, which is unrealizable.

For this reason, as shown in FIG. 6, a delay circuit 26 is inserted between the signals received through the radio communication and the correlation processing unit 25. Namely, the speech processing unit 15 comprises the delay circuit 26 for delaying signals transmitted through the radio communication, and the adaptive filter (24, 25) for extracting necessary components by correlating the reference signal and the delayed received signals, using the direct sound from the external as the reference signal.

As described above, the propagation speed of the signals received through the radio communication is faster than that of the sound waves (direct sounds) in the air. By operating the system while giving the sufficient delay to the signals propagated through the radio communication, the impulse response set to the adaptive filter is displaced as much as the inserted delay so that the appearance of the coefficient in the negative time region can be eliminated.

With this configuration, even in the case where the direct sound from the external is used as the reference signal, it becomes possible to adjust the ratio of the signals received through the radio communication and the direct sound appropriately, so that it is possible to realize the speech control according to the situation.

According to the headset system of the first embodiment, it becomes possible to adjust and control the radio of the signals received from the radio communication and the direct sounds from the external, based on the selection made by the user according to the situation.

Also, according to the headset system of the first embodiment, it becomes possible to apply appropriate delay processing in either case of using the received signals of the radio communication or the direct sounds from the external as the reference signals, so that it is possible to correlate both of them effectively.

The headset system of the first embodiment is suitable for the applications to the conference or party site, the conversation in the crowd, and the guidance of a tour through the factory or the like.

Figure 7:
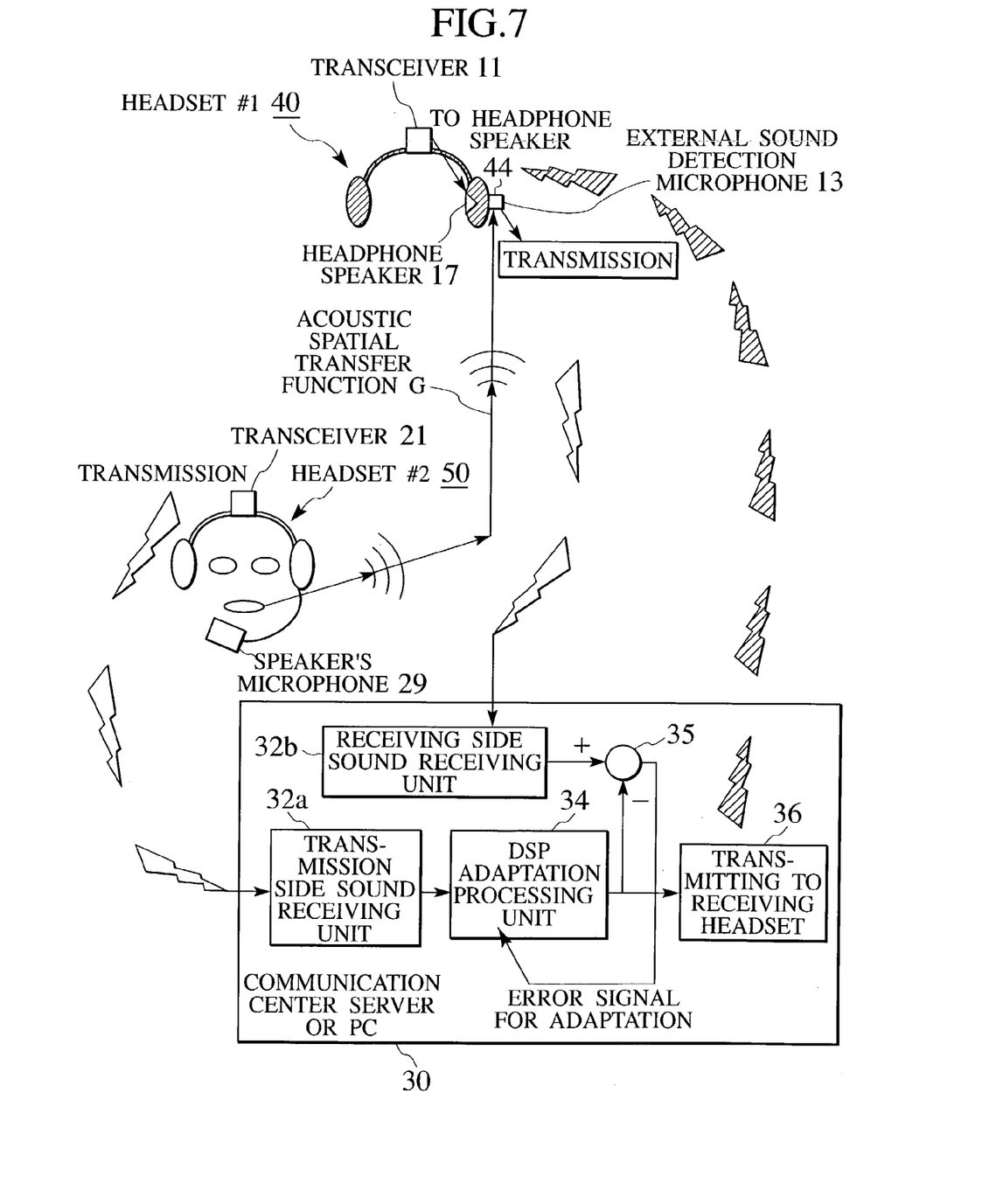
FIG. 7 is a diagram showing an overview of a short range radio communication headset system according to the second embodiment of the present invention.

Referring now to FIG. 7, the second embodiment of the present invention will be described in detail.

FIG. 7 shows a headset system according to the second embodiment of the present invention. In the second embodiment, the speech processing unit 15 that was provided inside the headset in the first embodiment is provided as an independent external device. Consequently, the control of the ratio between the speeches of the speaker transmitted through the radio communication and the direct sounds picked up from the external is carried out outside of the headset.

As shown in FIG. 7, the headset system of the second embodiment contains a first headset 40, a second headset 50, and an external speech processing device 30. The speech processing device 30 may be incorporated into a server of a communication center within a communication possible range, or may be incorporated into a mobile terminal (PC, portable telephone, PDA, etc.), for example.

The first headset 40 has an external sound detection microphone 13, a transmitter 44 for A/D converting the direct sounds picked up by the external sound detection microphone 13 and transmitting them to the speech processing device 30, and a transceiver unit 11. The transmitter 44 transmits the direct sounds of the external that after the digital conversion is applied to the speech processing device 30 at a first frequency.

The second headset 50 has a speaker's microphone 29 and a transceiver 21. The transceiver 21 transmits the communication content of the wearer of the second headset 50 to the speech processing device 30 at a second frequency.

The speech processing device 30 has a transmitting side sound receiving unit 32a for receiving speech transmitted from the second headset 50, and a receiving side sound receiving unit 32b for receiving direct sounds transmitted from the transmitter 44 of the first headset 40. A DSP adaptation processing unit 34 applies the DSP adaptation processing using the received signal of either one of the transmitting side sound receiving unit 32*a* or the receiving side sound receiving unit 32*b* as the reference signal, and supplies the signal applied with the DSP adaptation processing to a correlation processing unit 35. The correlation processing unit 35 obtains a correlation between the DSP adaptation processing applied reference signal and the other received signal, and outputs only desired components. A transmission unit 36 transmits the output of the correlation processing unit 35 to the first headset 40 at a third frequency.

The receiving function of the transmitter 11 of the first headset 40 is configured such that it does not receive the transmission frequency of the second headset 50 and it receives the radio signals from the speech processing device 30.

In the example of FIG. 7, only the necessary functions are shown by assuming that the first headset 40 is the receiving side and the second headset 50 is the transmitting side for the sake of simplicity, but it is possible for each headset to have the same configuration. In that case, both of the first headset 40 and the second headset 50 have the external sound detection microphone 13, the transmitter 44, and the speaker's microphone 17.

In the example shown in FIG. 7, the speech transmitted from the second headset 50 is used as the operation of the speech processing device 30. The speech processing device 30 obtains a correlation between the direct sounds picked up by the external sound detection microphone 13 of the first headset 40 and the reference signal, and only the correlated components are extracted. As a result, the speech content transmitted from the speaking side are reinforced and transmitted from the transmission unit 36 to the first headset 40. Of course, depending on the situation, it is also possible to output only the non-correlated components by removing the correlated components and transmit them to the first headset 40 such that the direct sound can be heard clear.

It is possible to provide the mode changing switch to each headset 40 or 50 such that the user can select which mode to switch by transmitting the output of the switch to the speech processing device 30.

Alternatively, it is also possible to provide the mode changing switch to a server or PC side to which the speech processing unit 30 is to be implemented. In the case of the lectures, game shows, entertainments at the small theaters, etc., it is often proceeded according to a predetermined scenario. In such cases, it is possible to provide the mode changing switch to the server or PC of the communication center to which the speech processing device is to be incorporated, such that an operator carries out the mode switching operation manually. It is also possible to adopt a configuration in which the mode is changed automatically according to a program installed in advance.

Furthermore, it is possible to use a configuration in which the speech processing device 30 is incorporated into the PDA or mobile terminal of the listener's side such that the user can selectively extracts the necessary speech components according to the situation.

In the headset and the headset system using that headset according to the second embodiment, the speech processing function is provided outside of the headset so that the configuration of the headset itself becomes simple, and it is possible to reduce a size of the headset itself.

Figure 8:
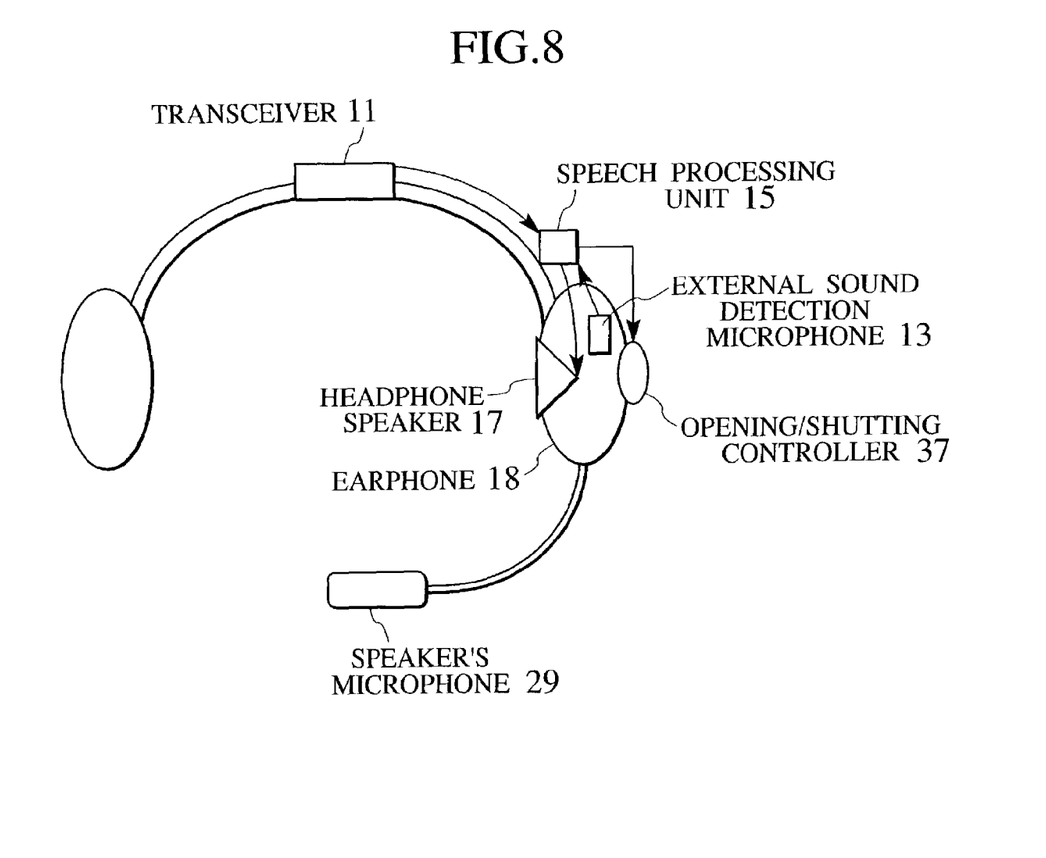
FIG. 8 is a diagram showing an overview of a short range radio communication headset according to one modified embodiment of the present invention.
Figure 9:
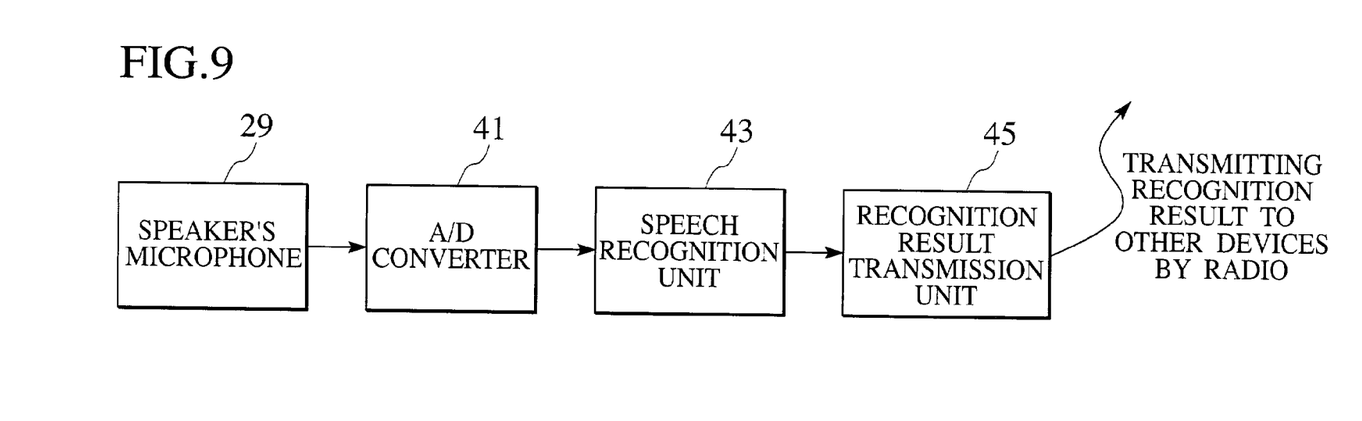
FIG. 9 is a block diagram showing a speech recognition processing system to be used in association with a headset according to another modified embodiment of the present invention.
Figure 10:
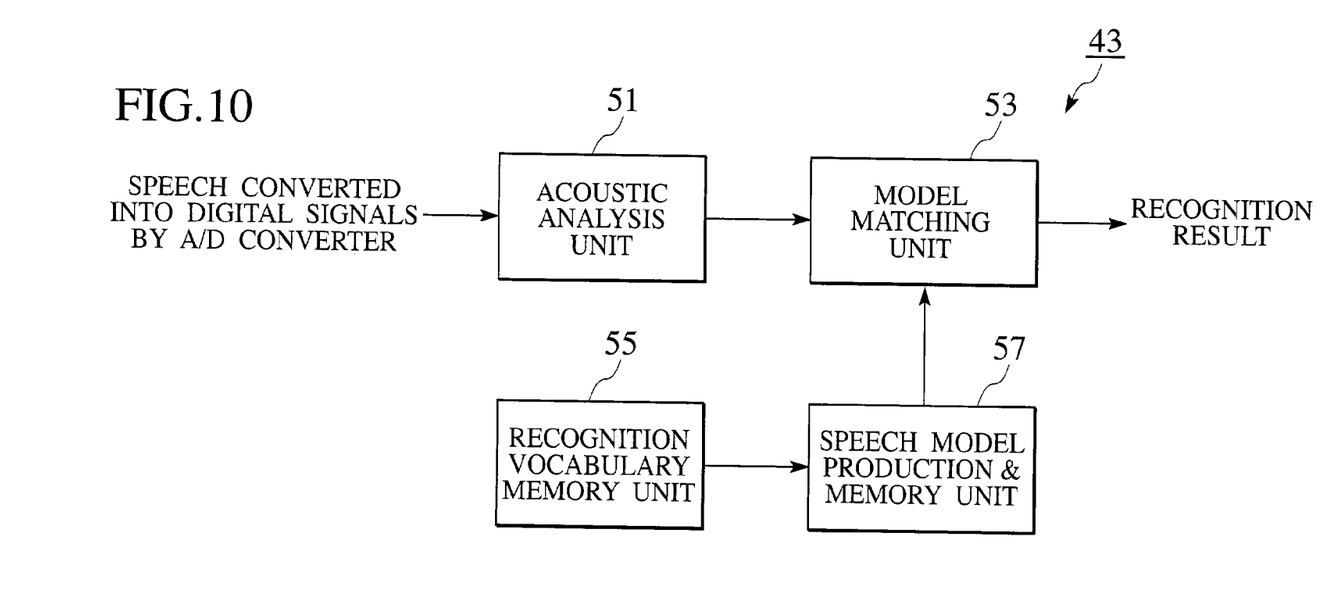
FIG. 10 is a block diagram showing an internal configuration of a speech recognition unit shown in FIG. 9.

Referring now to FIG. 8 to FIG. 10, the other modified embodiments of the present invention will be described in detail.

In the first and second embodiments described above, the selective controlling of the speeches in the case where it is desired to hear the direct sound as well by the listener has been described, However, depending on the situation, there can be cases where it is desired to shut out the direct sounds entered from the external completely because only the speeches through the radio communication are important. In such cases, it is possible to make a switching to a mode in which the direct sounds are not inputted to the external sound detection microphone or the speech processing unit.

Such a switching is realized by providing an opening/shutting controller 37 to a earphone 18 of the headset as shown in FIG. 8. The opening/shutting controller 37 is a physical door provided outside the external sound detection microphone, for example, which can shut out the external sounds by closing it. Else, the opening/shutting controller 37 can be located at an input portion of the speech processing unit such that it can be realized as an electronically blocking circuit which is equivalent to the physical door with respect to the sounds.

In the first and second embodiments described above, the output from the adaptive filter of the speech processing unit is directly sent to the headphone speaker, but it is also possible to output the output of the adaptive filter by mixing it with the direct sounds or the speeches from the radio communication from the headphone speaker.

Also, the above description of the present invention is directed to the case of using a headset for covering both ears, but it is also possible to use a headset for covering one ear. In particular, in the case of the second embodiment, the speech processing device is provided externally so that it is easier to make the headset in a smaller size and it is also possible to make a earplug type headset.

Also, in the above description, the transceiver is provided on a band section of the headset, but it is also possible to provide it on the earphone along with the external sound detection microphone.

Also, in the case of using a third headset in the above described headset system. it is possible to transmit a relative positional information of the headset by radio communication separately from the speech signals. It is possible to calculate a distance between the transmitting side and the receiving side according to the positional information and change a cancelling target or controlling an amount of cancelling according to the calculated distance.

It is also possible to attach a special ID signal to the speech to be transmitted/received through the radio communication, as a way of transmitting the speech in emergency. In this case, the speech processing unit also has a unit for detecting the emergency ID. When the emergency ID is detected, the correlation processing unit will not carry out the cancelling processing with respect to the signals received through the radio communication. In this way, it is possible to ensure the communication in the case of the emergency.

In the first and second embodiments, the operation of the headset when there is a correspondent has been described, but the present invention is also applicable to the case where a single user wears the headset and issues the speech data or command to a surrounding device. For example, the present invention is suitable for the case of operating the air conditioner or the washing machine by the speech using the headset while the surrounding is noisy due to the TV or the music, the case of controlling on/off of a necessary device under the environment in which the operating sound of the other device is noisy, or the case of carrying out the dictation.

In this case, as shown in FIG. 9, the speech command of the wearer (user) detected by the speaker's microphone 29 of the headset is converted into the digital speech signal by an A/D converter 41 first. A speech recognition unit 43 recognizes the speech detected by the speaker's microphone 29 and outputs the speech recognition result. The speech recognition result is then sent to a recognition result transmission unit 45 having a short range radio communication function and communicated to the other devices from there.

FIG. 10 shows an internal configuration of the speech recognition unit 43. The digital speech signal outputted from the A/D converter 41 is inputted into an acoustic analysis unit 51. The acoustic analysis unit 51 converts the input speech of a prescribed period of time into feature parameters. The output of the acoustic analysis unit 51 is a time series of the feature parameters (feature parameter sequence). The acoustic analysis unit 51 outputs the obtained feature parameter sequence of the input speech to a model matching unit 53.

On the other hand, a recognition vocabulary memory unit 55 stores pronunciation information for words necessary in producing a speech model of each word constituting the recognition vocabulary and a word ID to be outputted as the recognition result when each word is recognized.

A recognition model production and storage unit 57 stores the speech model of each word and the word ID outputted from the model matching unit 53 as the recognition result when each word is recognized, in advance.

The model matching unit 53 calculates a similarity or a distance between each speech model of a recognition target word stored in the speech model production and memory unit 57 and the feature parameter sequence of the input speech, and outputs the word ID corresponding to the speech model with the maximum similarity (or the minimum distance) as the recognition result.

The word ID outputted from the model matching unit 53 becomes the output of the speech recognition unit 43, and entered into the recognition result transmission unit 45. The recognition result transmission unit 45 transmits the word ID to the other devices by using a transmission function contained in the radio communication module.

The A/D converted speech may be processed by the speech processing unit before it is entered into the speech recognition unit 43. In this case, the A/D converted speech of the user becomes the reference signal. The direct sounds picked up by the external sound detection microphone are correlated with this reference signal, and all the non-correlated components are removed. The output of the correlation processing unit is sent to the speech recognition unit 43 as a clearer signal in which the speech data of the user is reinforced.

In such a headset, the switch operation or the keyboard operation is unnecessary, and the user's action is not obstructed, so that it becomes possible to send the speech data or the speech command to the other devices in real time. The user can carry out an accurate remote controlling in a hand-free state, so that the working efficiency can be improved.

Also, by applying the speech processing to the speech uttered by the user, the clear speech data or speech command in which no noise is mixed can be transmitted so that it is possible to prevent the erroneous operation of the device.

As described above, the user of the headset can selectively control the ratio of the speeches transmitted through the radio communication and the direct sounds from the external according to the situation of the surrounding.

By extracting only the necessary speech information, it is possible to realize smooth speech communications that will not cause the mental stresses.

Even when the surrounding is noisy, the speeches are outputted from the headphone speaker in a state of having the noises removed or reduced, so that the users wearing the headsets can carry out the conversation by the low voices through the radio communications. As a side effect, it is possible to prevent the situation for inducing the increase of the noises in the surrounding.

When such a short range radio communication headset becomes widespread, it is possible to create a new form of the speech communication culture.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A short range radio communication headset, comprising:
   a transmitter configured to transmit or receive signals by short range radio communications;
   an external sound detection microphone configured to detect direct sounds propagated from an external;
   a speech processing unit configured to receive inputs of received signals received by the transceiver and the direct sounds detected by the external sound detection microphone, and selectively control a ratio between the received signals and the direct sounds; and
   a speaker configured to output speeches with the ratio controlled by the speech processing unit,
   wherein the speech processing unit comprises a unit configured to detect whether an emergency ID signal is attached to the received signals of the transceiver or not, and the speech processing unit does not reduce a ratio of the received signals when the emergency ID signal is attached to the received signals.

2. The short range radio communication headset of claim 1, wherein the speech processing unit has:
   an A/D converter configured to convert the direct sounds into digital signals;
   an adaptation processing unit configured carry out an adaptation processing using either the received signals of the transceiver or the digital signals converted from the direct sounds as reference signals; and
   a correlation processing unit configured to extract desired components by correlating the reference signals with another one of the received signals of the transceiver or the digital signals converted from the direct sounds that are not used as the reference signals.

3. The short range radio communication headset of claim 2, wherein the speech processing unit outputs the received signals of the transceiver to the speaker in a reinforced form obtained by the correlation processing unit.

4. The short range radio communication headset of claim 2, wherein the speech processing unit outputs the direct sounds to the speaker in a reinforced form obtained by the correlation processing unit.

5. The short range radio communication headset of claim 2, wherein the speech processing unit uses the received signals of the transceiver as the reference signals, and the correlation processing unit extracts the desired components by correlating the direct sounds with the reference signals and sends a correlation result to the adaptation processing unit.

6. The short range radio communication headset of claim 2, wherein the speech processing unit also has a delay circuit for giving a delay to the received signals of the transceiver, and uses the direct sounds as the reference signals, and the correlation processing unit extracts the desired components by correlating the received signals delayed by the delay circuit with the reference signals and sends a correlation result to the adaptation processing unit.

7. The short range radio communication headset of claim 1, further comprising an opening/shutting controller configured to shut out the direct sounds propagated from the external according to needs.

8. A short range radio communication headset comprising:
   a transmitter configured to transmit or receive signals by short range radio communications;
   an external sound detection microphone configured to detect direct sound propagated from an external;
   a speech processing unit configured to receive inputs of received signals received by the transceiver and the direct sounds detected by the external sound detection microphone, and selectively control a ratio between the received signals and the direct sounds; and
   a speaker configured to output speeches with the ratio controlled by the speech processing unit,
   wherein the speech processing unit has:
   an A/D converter configured to convert the direct sounds into digital signals;
   an adaptation processing unit configured carry out an adaptation processing using either the received signals of the transceiver or the digital signals converted from the direct sounds as reference signals; and
   a correlation processing unit configured to extract desired components by correlating the reference signals with another one of the received signals of the transceiver or the digital signals converted from the direct sounds that are not used as the reference signals, and
   wherein the speech processing unit has a first mode for outputting the received signals of the transceiver in a reinforced form, and a second mode for outputting the direct sounds in a reinforced form, as obtained by the correlation processing unit, and the short range radio communication headset further comprises a mode changing switch for switching the first mode and the second mode.

9. The short range radio communication headset of claim 8, wherein the speech processing unit outputs the received signals of the transceiver to the speaker in a reinforced form obtained by the correlation processing unit.

10. The short range radio communication headset of claim 8, wherein the speech processing unit outputs the direct sounds to the speaker in a reinforced form obtained by the correlation processing unit.

11. The short range radio communication headset of claim 8, wherein the speech processing unit uses the received signals of the transceiver as the reference signals, and the correlation processing unit extracts the desired components by correlating the direct sounds with the reference signals and sends a correlation result to the adaptation processing unit.

12. The short range radio communication headset of claim 8, wherein the speech processing unit comprises a delay circuit for giving a delay to the received signals of the transceiver, and uses the direct sounds as the reference signals, and the correlation processing unit extracts the desired components by correlating the received signals delayed by the delay circuit with the reference signals and sends a correlation result to the adaptation processing unit.

13. The short range radio communication headset of claim 8, further comprising an opening/shutting controller configured to shut out the direct sounds propagated from the external according to needs.

* * * * *